United States Patent [19]
Laurich-Trost

[11] 4,446,941
[45] May 8, 1984

[54] STEERING SYSTEM FOR UTILITY VEHICLE

[76] Inventor: Victor R. Laurich-Trost, 34600 McAfee Dr., Solon, Ohio 44139

[21] Appl. No.: 302,516

[22] Filed: Sep. 18, 1981

[51] Int. Cl.³ .................... B62K 17/30; B62K 17/34
[52] U.S. Cl. ................................. 180/236; 180/140; 180/149; 180/242
[58] Field of Search .............. 180/140, 149, 236, 242; 280/91, 96

[56] References Cited
U.S. PATENT DOCUMENTS

| | | | |
|---|---|---|---|
| 1,285,289 | 11/1918 | McGeorge | 280/91 |
| 2,512,979 | 6/1950 | Strother | 180/140 |
| 3,998,288 | 12/1976 | Aoki | 280/96 |
| 4,175,638 | 11/1979 | Christensen | 180/140 |
| 4,219,094 | 8/1980 | Sturgill | 180/236 |

*Primary Examiner*—John A. Pekar
*Attorney, Agent, or Firm*—Watts, Hoffmann, Fisher & Heinke Co.

[57] ABSTRACT

A steering system for a multi-mode steering vehicle wherein the front and rear wheel pairs are mechanically interconnected to one another for synchronous turning movement from 0° through 90°, and the front and rear wheel pairs being electronically coupled together to enable a predetermined synchronous turning (tracking) of the rear wheels in relation to turning movement of the front wheels.

6 Claims, 2 Drawing Figures

STEERING SYSTEM FOR UTILITY VEHICLE

DESCRIPTION

1. Technical Field

The present invention relates generally to a steering system for an excavating or material handling vehicle and more specifically relates to a steering system for electronically controlling the synchronous turning movement between the front and rear wheels of such vehicle for turning movement from 0° through 90°.

2. Background Art

The present invention relates to a steering system for an excavating or material handling vehicle of the type described, for example, in applicant's co-pending U.S. application Ser. No. 106,468 filed Dec. 26, 1979, now Pat. No. 4,363,409. In such application, there is disclosed a multi-purpose utility vehicle for handling various products and/or materials which utility vehicle incorporates, on one chassis, an articulated, pivotally mounted, telescopic boom assembly for continuous pivotal movement capable of rotation through an arc of 360°. The vehicle may further mount a hydraulically operated lift or platform in conjunction with a dual telescopingly, hydraulically actuated outrigger assembly which may be extended and retracted longitudinally and laterally for stabilizing the vehicle during handling of relatively heavy loads. Such vehicle type is extremely versatile and flexible and incorporates a low design profile having a low center of gravity for high load-lift capability. Prior handling trucks or vehicles of a different design but of this general type are described, for example, in U.S. Pat. Nos. 2,506,242 and 3,229,830.

Disclosure of the Invention

The present invention provides an automatic steering system for use with a multi-mode steering truck or vehicle wherein the front and rear wheels of the vehicle are automatically and electronically controllable such that the rear wheels can be synchronously turned to selectively track the turning movement of the front wheels, such as when the front wheels are turned through an angle from 0° through 90°. More specifically, in the present invention the front and rear wheels are hydraulically actuated and mechanically interconnected for synchronous turning movement from 0° through 90° in either direction, and wherein the rear wheels are capable of tracking turning movement of the front wheels in a predetermined relationship by means of an electronic control system to provide multi-modes of steering. In the invention, the multi-mode steering enables the vehicle to move linearly forwardly and backwardly, linearly in a direction transverse to the longitudinal movement of the vehicle to either side (i.e , 90° ), angularly at an angle from 0° through 90° (i.e., crabbing) or thorugh an angle of 360° upon turning the front and rear wheels in opposite directions.

Best Mode for Carrying Out the Invention

Figure 1:
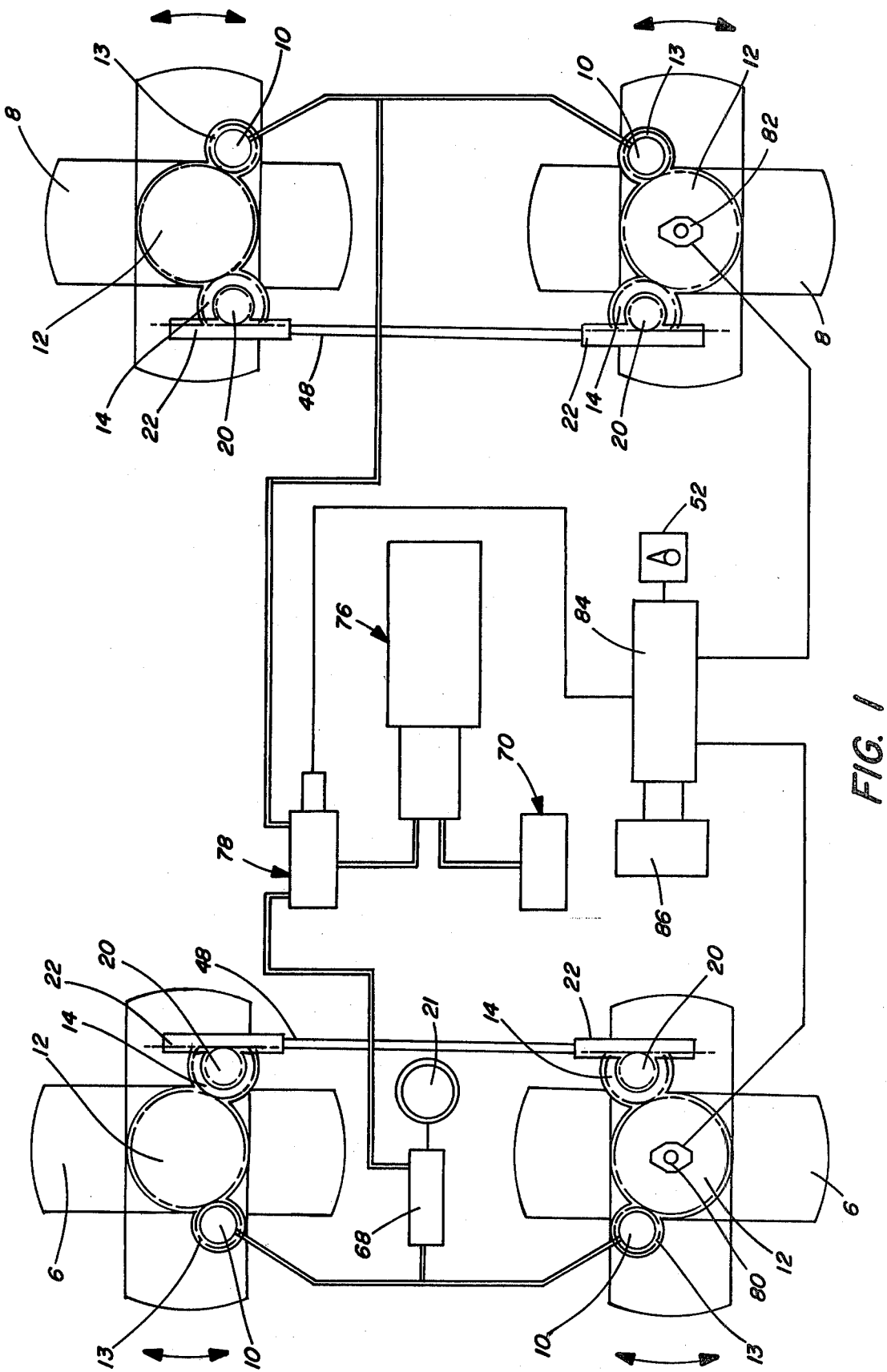
FIG. 1 is a schematic illustration showing in top plan view one form of the steering sytem in accordance with the invention.

Referring now again to the drawings and in particular to FIG. 1 thereof, there is diagrammatically illustrated one form of the steering system for electronically and hydraulically controlling synchronous turning movement of the front and rear wheels of the vehicle. The system is diagrammatically depicted in association with a utility vehicle of the type described in applicant's aforemention co-pending application Ser. No. 106,468. As shown, the vehicle includes a pair of front wheels 6 and a pair of rear wheels 8 which mount the vehicle chassis for driving movement along the ground. As in applicant's aforementioned application, the wheels 6 and 8 are each independently and hydraulically driven for rotation about a horizontal axis for moving the vehicle along the ground. In such case, the wheel 6 and 8 are hydraulically driven by hub type hydrostatic motors of the type commercially available from the Rex-Roth Company of Germany under Model Number CHB-81574RTX. These self-propelled wheels 6 and 8 are each rotatable about a horizontal axis by independent hydraulic orbital motors 10. The orbital motors 10 each include drive gears 13 which mesh with driven ring gear 12 fixedly connected to the respective wheels 6 and 8. The orbital motors 10 are commercially available from the Char-Lynn Company under Model No. 103-1007-007, Series S. Accordingly, upon actuation of the orbital motors the drive gears 13 drive the driven ring gear 12 about a vertical axis such that the ring gears 12 then rotate the respective wheels 6 and 8 about a horizontal axis for turning or steering the wheels from 0° through 90° in either direction, as desired.

In the embodiment illustrated, the front wheels 6 are mechanically interconnected for synchronous turning movement with one another by means of a tie-rod assembly which includes a tie-rod member 48. The tie-rod member 48 mounts a pair of reciprocable rack members 22 that engage pinion gears 20. The pinion gears 20 together with the rack members 48 are mounted on the chassis and the pinion gears, in turn, mesh with drive gears 14 that, in turn, mesh with the driven ring gears 12 that are fixedly connected to the respective wheels, as aforesaid. By this arrangement, rotation of the driven ring gears 12 reciprocates the rack members 22 inwardly and outwardly for mechanically synchronous turning movement between the respective wheels. In this embodiment, an identical rear wheel tie-rod assembly may be utilized for the rear wheels 8 wherein like reference numerals designate like parts throughout.

Figure 2:
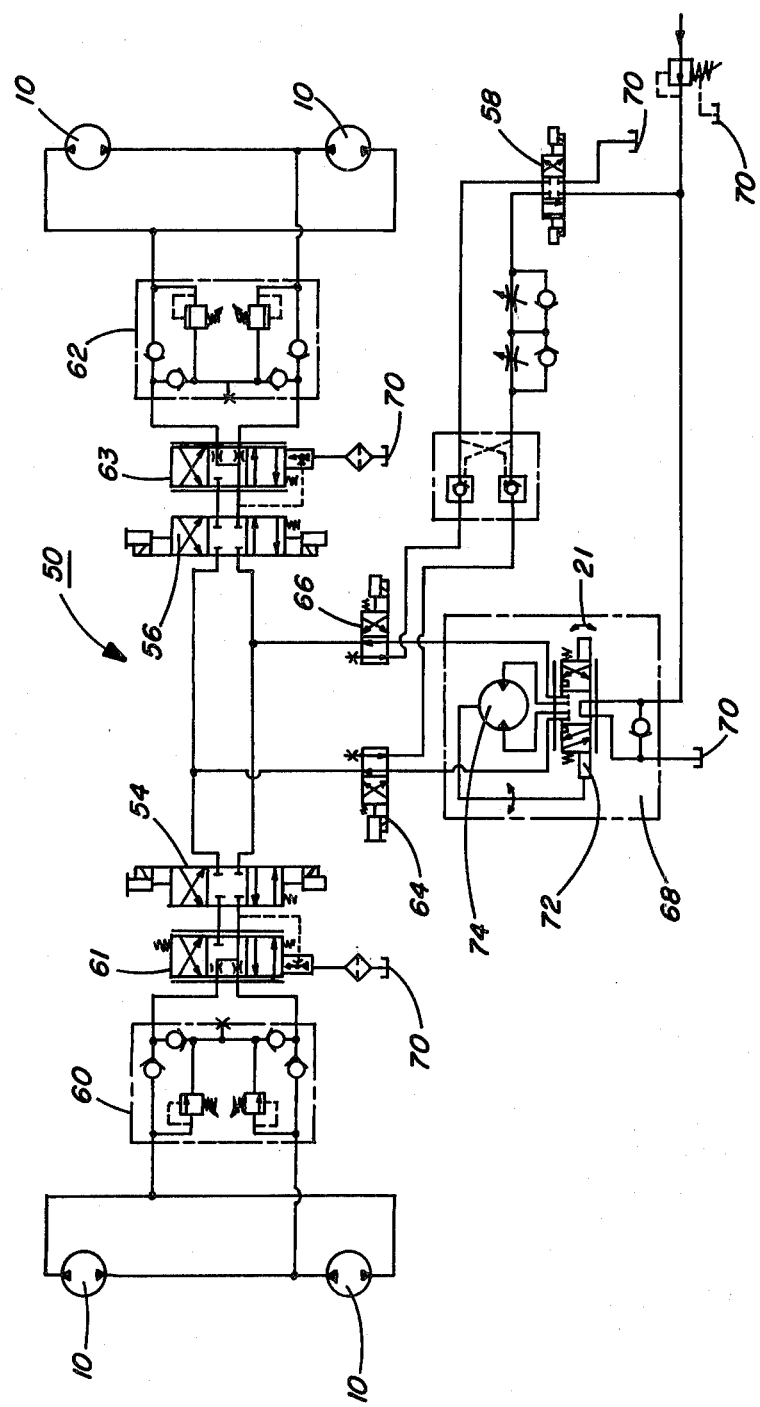
FIG. 2 is a schematic illustration which diagrammatically shows one form of the hydraulic system for steering the vehicle in accordance with the invention.

Now referring to FIG. 2 of the drawings, there is illustrated one form of a hydraulic control system, designated generally at 50, which may be employed with the type of electronic control system illustrated in FIG. 1. In a typical operation and with reference to the drawings, when all four wheels are disposed in a straight forward or neutral position, a steering mode selector switch 52 is held in the neutral position. In this position, electric solenoid directional control valves 54, 56 and 58 are not energized. In this condition, the motion control valves 60 and 68 act to lock the four orbital steering motors 10 to prevent driving rotation thereof so as to maintain all of the wheels in a straight forward direction for driving forwardly and backwardly.

In the front wheel steer only mode, the steering mode selector switch 52 is acutated for front wheel steering. Actuation of the switch energizes solenoid directional control valves 64 and 66 which allows directional fluid (oil) flow from the power steering valve unit 68. The power steering valve unit 68 is of a commercial type available from the Char-Lynn Company and is described in U.S. Reissue Pat. No. 25,126 assigned to the Germane Company of Minneapolis, Minn. The power steering unit 68, in turn, is actuated by turning the steering wheel 21 in either direction, as desired. In this mode, the directional solenoid control valves 56 and 58 are not actuated and have blocked center to prevent fluid flow to the oil tank 70 thereby to lock the rear wheels 8 in the neutral position. Manual steering (automotive) upon turning of the steering wheel 21 allows the front orbital motors 10 to automatically turn the front wheels 6 synchronously together in either direction from 0° through 90°.

In the rear wheel steering only mode, the steering mode selector switch 52 is acutated so as to be in the rear wheel steer position. Actuation of this switch energizes solenoid control valves 64 and 66 which allows fluid flow from the power steering unit 68. In this mode, the solenoid control valves 54 and 58 are not energized and have blocked center to prevent fluid flow back to the tank 70 so as to lock the front wheel 6 in the neutral position. Manual turning (automotive) of the steering wheel 21 now allows the rear orbital motors 10 to drive the rear wheel 8 in either direction from 0° through 90°.

As described in the applicant's co-pending U.S. application Ser. No. 299,052, filed Sept. 4, 1981, the power steering control unit 68 comprises a fluid valve structure of the type described aforementioned U.S. Reissue Pat. No. 25,126. In this case, the unit includes a spool valve 72 and a main control valve 74 which is controlled by the spool valve 72, as disclosed in such Reissue patent which is incorporated by reference herein.

In the front and rear wheel steer (automotive) mode, the steering mode selector switch 52 is actuated to the front and rear wheel steer position. Actuation of the switch energizes solenoid control valves 64 and 66 which direct fluid flow from the power steering unit 68. Also, directional solenoid control valves 54, 56 are energized which actuates electric servo valves 61 and 63. This enables fluid under pressure to flow from the power steering unit 68 simultaneously to all four orbital steering motor 10. Accordingly, this enables the front wheel 6 to turn simultaneously in one direction and the rear wheels 8 to turn simultaneously in the opposite direction, if desired, to enable the vehicle to turn on a radius through an arc of 360°. In this mode, the directional control valve 58 is not energized and has blocked center so as to turn fluid flow back to the tank 70. Manual steering (automotive) now allows the front and rear orbital drive motors 10 to steer in either direction, as desired.

In the front and rear wheel steer mode for turning 90° in the same direction, the steering mode selector switch 52 is actuated to the front and rear wheel steer for 90° turn position. This energizes directional solenoid control valves 54, 56, 64, 66 and 58 and electric servo valves 61 and 63 which then direct fluid flow from the hydraulic power steering unit 68. When the directional solenoid control valve 58 is energized to give a full 90° turn to the front and rear wheels in the same direction, this acts to bypass the manual (automotive) steering via the power steering control unit 68. If the directional solenoid control valve 58 is not energized, the 90° turning is achieved by manual (automotive) steering upon turning movement of the steering wheel 21 so as to actuate the power steering unit 68. By this manual steering arrangement, the operator is enabled to steer from 0° to 90° in a "crabbing" mode of operation in a clockwise or counter-clockwise direction. Accordingly, when directional solenoid control valves 64, 66, 54 and 56 together with the directional control valve 58 are energized, and electric servo valves 61 and 63 are energized, the front wheels and rear wheels are automatically turned the full 90° in the same direction. This by-passes the manual (automotive) steering mode. When the solenoid control valve 58 is not energized, then the hydraulic power steering control unit 68 is not by-passed and the front and rear wheels can be turned from 0° through 90° for a "crabbing" mode of operation upon turning of the steering wheel 21, as aforesaid. Accordingly, by this arrangement the front and rear wheels can be turned automatically a full 90° to either direction to enable the vehicle to travel transversely in respect to the longitudinal central axis of the vehicle or turning movement of the wheels can be accomplished in a manual (automotive) mode via the hydraulic power steering unit 68 dependent upon the desired application.

Now referring again to FIG. 1 of the drawings, the hydraulic control system 50 (FIG. 2) may be supplied with fluid pressure (oil) from a tank 70 via a suitable motor-pump unit, designated generally at 76. Fluid pressure supplied by the motor-pump is directed through a electric servo control valve unit 78 for delivery to the power steering unit 68 for steering the front and rear wheels via orbital motors 10, as aforesaid. Now in the invention, there is provided an electrical control circuit for automatically and synchronously controlling the turning (tracking) of the rear wheel 6 in relation to the front wheels 8. In this embodiment, the system includes a front angle sensor 80 which is fixedly connected to the driven ring gear 12 of one of the front wheels 6 and a rear angle sensor 82 which is fixedly connected to the drive ring gear 12 of one of the rear wheels 8. The angle sensors 80 and 82 may be of the rotatable potentiometer type which are fixedly attached to and turn angularly with the ring gears 12 that, in turn, are fixedly attached to the wheels 6 and 8 adapted for producing a voltage signal based upon the angular position of the wheels. The sensors 80 and 82 are in circuit with a voltage differential controller 84 which monitors the sensor integrity. The controller 84 is in circuit with the aforementioned steering mode selector switch 52 which may be powered by a suitable battery 86. The controller 84 is in circuit with the electric servo valve 78 that, in turn, is in circuit with the front and rear wheels via the power steering unit 68, as aforesaid. In this case, a single servo valve 78 may be utilized in place of the two servo valves 61 and 63 illustrated in FIG. 2. That is, the servo valve 78 acts to control fluid pressure flow to and from the rear wheels 8 in relation to the voltage output signals from the front and rear angle sensors 80 and 82. In operation, the front angle sensor 80 detects any change in the position of the front wheels. The electric servo valve 78 receives the voltage output signal from the sensor 80 which is proportional to the new wheel position. Similarly, the rear wheel sensor 82 sends an output voltage signal which is proportional to the new rear wheel position such that the voltage differential between the sensors 80 and 82 corresponds to the angular difference between the front and rear wheel steering positions. This voltage signal is amplified by suitable circuitry within the controller 82 and the differential output voltage signal is utilized to energize electric servo valve 78 for controlling fluid pressure to the rear wheels 8. As the rear wheels turn, the output voltage signal from the rear sensor 82 approaches the output volage signal of the front sensor 80 and this process continues unitl the differential voltage between the front and rear sensors comes within a predetermined limit indicating that the rear wheels are properly tracking the front wheels. For example, if the differential voltage between the rear and front sensors comes within 5 millivolts, the rear wheels may be determined to be turned sufficiently to properly track the turning movement of the front wheels. Accordingly, by this arrangement it has been found that the rear wheel 8 can properly track turning movement of the front wheels within approximately 1°. During this read-out by the sensors, the controller 84 by suitable circuitry monitors the integrity of the sensors to indicate the accuracy of the sensors for reading within the predetermined limits. For example, should the sensor output voltage signal fall outside the pre-set limits, the drive to the rear wheels 8 via the servo valve 78 would be energized to stop any further turning movement of the wheels. In such case, the drive may remain uninhibited until the problem is corrected, or the operator may simply switch to another mode in which the particular sensor is not employed. Accordingly, by this arrangement there is provided an electronic coupling between the front and rear wheels which is automatically controllable to provide a predetermined synchronous tracking movement of the rear wheels in relation to the front wheels for turning movement from 0° through 90° in either direction.

I claim:

1. A steering system for a utility vehicle having multi-steering modes of operation comprising a pair of front wheels and a pair of rear wheels mounted on a chassis for driving movement in an angular and linear directions, motor drive means operably associated with each of said wheels for driving the said wheels in clockwise or counterclockwise directions, said front wheels being hydraulically driven and also mechanically interconnected together for synchronous turning movement and said rear wheels being hydraulically driven and also mechanically interconnected together for synchronous turning movement, and electrical control circuit means operably coupling said front to said rear wheels to enable a predetermined synchronous turning movement of said rear wheels in relation to said front wheels.

2. A steering system in accordance with claim 1, wherein said electrical control means includes an electronic angle sensor means operably associated with one of said front wheels and another electronic angle sensor means operably associated with one of said rear wheels and adapted to produce voltage output signals proportional to the front and rear wheel turning positions, voltage comparator means in circuit with said angle sensor means adapted to receive said front and rear voltage output signals and adapted to produce a differential output voltage signal corresponding to the angular difference between the turning movement said front and rear wheels, and solenoid valve control means adapted to be energized by said differential output voltage signal.

3. A steering system in accordance with claim 1, including a first rack and pinion means mechanically interconnecting said front wheels, a second rack and pinion means, mechanically interconnecting said rear wheels, each of said wheels containing hydraulic motor means for independently rotating said wheels about a horizontal axis, hydraulic orbital drive means associated with each of said wheels for turning said wheels through an angle from 0° to 90°, hydraulic servo control valve means for regulating the flow of fluid pressure to said hydraulic orbital drive means, and said electrical control circuit means operably associated with said servo valve means for electronically controlling synchronous turning movement of said rear wheels in relation to synchronous turning movement of said front wheels.

4. A steering system in accordance with claim 2, wherein said angle sensor means includes a rotatable potentiometer means operably connected to one of said front wheels and to one of said rear wheels adapted to be actuated to produce a voltage output signal that is a measure of the angular turning movement of said wheels about a vertical axis.

5. A steering system in accordance with claim 4, wherein one of said front wheels and one of said rear wheels each fixedly mount a driven ring gear means adapted to be driven about a vertical axis by said hydraulic orbital drive means for turning said wheels in either direction from 0° through 90°, said rotatable potentiometer means being fixedly attached to said driven ring gear means for rotation therewith upon actuation of said hydraulic orbital drive means.

6. A steering system for a utility vehicle having multi-steering modes of operation comprising a pair of front wheels and a pair of rear wheels mounted on a chasis for driving movement in angular and linear directions, motor drive means operably associated with at least one pair of said wheels for driving said wheels in clockwise or counterclockwise directions, hydraulic orbital drive means associated with at least one pair of said wheels for actuating the turning of said wheels through an angle from 0° to 90°, a pinion means associated with each wheel of one pair of wheels, a rack means driven by said pinion means to mechanically connect the wheels of said pair.

* * * * *